Patented Mar. 31, 1953

2,633,460

UNITED STATES PATENT OFFICE 2,633,460

LOW-TEMPERATURE POLYMERIZATION OF VINYL HYDROXYALKYL ETHERS TO RESINOUS POLYACETALS

Harry T. Neher, Bristol, and La Verne N. Bauer, Philadelphia, Pa., assignors to Rohm & Haas Company, Philadelphia, Pa., a corporation of Delaware No Drawing. Application September 25, 1951, Serial No. 248,282

5 Claims. (Cl. 260—91.1)

This invention deals with resinous polyacetals which are linear in nature and which are formed under acid catalysis in the cold, said polyacetals being derived from vinyl hydroxyalkyl ethers having the formula $$CH_2=CHOC_nH_{2n}OH$$

where $C_nH_{2n}$ is an alkylene group having a chain of two to three carbon atoms between oxygen atoms.

The resulting polyacetals may be represented by the formula $$CH_2=CH[OC_nH_{2n}OCH(CH_3)]_xOC_nH_{2n}OH$$

where $x$ is an integer which is a number one less than the number of monomer molecules entering into the polymer. Each polymer molecule has an unsaturated group and an active hydrogen in a hydroxyl group. The unsaturated group, a vinyl radical, undergoes Michael addition reactions with compounds having reactive hydrogens. For example, under the influence of a catalyst the polyacetals add alcohols or mercaptans at the vinyl group. From long-chained alcohols or mercaptans there are formed surface active agents which have soap-like properties and which are useful as cleansing, dispersing, and emulsifying agents under neutral and alkaline conditions. The polymers and their derivatives are, however, decomposed in acidic solution and may thus be disposed of after they have served their purpose. The polyacetals are also useful as adhesives and as thickening agents for solutions which are neutral to alkaline.

When vinyl hydroxyethyl ether is treated with a strong acid, or with an acidic condensing agent such as a heavy metal chloride, or with a boron trifluoride catalyst at a temperature above 0° C., it has been observed that cyclic acetals are formed. For example, Hill et al. have reported (e. g., J. Amer. Chem. Soc. 50, 2718) that a trace of 50% sulfuric acid caused an almost explosive reaction of vinyl hydroxyethyl ether. A practically quantitative rearrangement into cyclic ethylidene glycol was obtained, even with cooling to prevent volatilization of ethylidene glycol, which boils at 81°–82° C. at 760 mm. In the formation of vinyl hydroxyethyl ether from acetylene Hill et al. noted, as did also Reppe (U. S. Patent 1,959,927), that the cyclic acetal can be formed. Because of the proclivity of 1,2- and 1,3-glycols to yield cyclic acetals, the methods used heretofore have not been directed to the production of linear polyacetals therefrom and formation of such linear polymers has not been observed. While methods, such as the interchange method, have been utilized for the formation of linear polyacetals, these methods are applicable only to acetal derivatives based on 1,4-glycols or glycols having even longer carbon chains between oxygen atoms. Such polyacetals, however, have completely different properties from the novel polyacetals which are made according to this invention and which are derived from 1,2- and 1,3-glycols.

Formation of polyacetals from vinyl hydroxyalkyl ethers in which the alkyl group has a chain of two to three carbon atoms between the oxygen of the hydroxyl groups and the ether oxygen is accomplished by treating said ether with a strongly acidic condensing agent at a polyacetal-forming temperature below −5° C.

As catalysts there may be used a strongly acidic Friedel-Crafts-type catalyst such as aluminum chloride, zinc chloride, ferric chloride, stannic chloride, or the like strongly acidic halide, or a strong acid such as sulfuric, p-toluene sulfonic, methionic, phosphoric, or polyphosphoric acids, or a hydrogen halide, these acids being for the most part strong inorganic acids or organic sulfonic acids, or a boron trifluoride catalyst, including coordination complexes of boron trifluoride and oxygenated organic compounds, such as ethers, alcohols, carboxylic acids, and the like.

These strongly acidic condensing agents must be used at a low temperature to give formation of polyacetals from ethers of the formula $$CH_2=CHOC_nH_{2n}OH$$

Boron trifluoride catalysts are best used in the range from −15° to −60° C. Other strongly acidic catalysts can be used between −5° C. and −90° C. For any given catalyst there is an optimum temperature range for a particular vinyl hydroxyalkyl ether and a few simple tests will show what the most effective temperature level is by a thickening of the mixture containing ether and catalyst.

Upon formation of a polyacetal under the influence of an acidic condensing agent at a low temperature it is desirable to destroy the catalyst, as by addition of an alkaline reagent, such as sodium carbonate, potassium carbonate, sodium bicarbonate, sodium hydroxide, or the like, before the temperature of the reaction system is allowed to rise to a level where decomposition of polyacetal would result from the presence of strong acid. With boron trifluoride catalysts the decomposition should be accomplished below −5° C. With strong inorganic acids neutralization should be performed at temperatures equally low and the destruction of catalysts should be started below 0° C.

Polyacetal-formation is best carried out in the presence of an organic solvent. This permits contacting of vinyl hydroxyalkyl ether with a strongly acidic catalyst without danger of uncontrollable reactions leading to cyclic products. Chlorinated solvents such as methyl chloride, methylene dichloride, ethylene dichloride, or chloroform, hydrocarbons such as petroleum ether and propane, or ethers such as ethyl ether, isopropyl ether, or amyl ethers are particularly useful. The solvent and also the reaction system are used and maintained during polymerization under anhydrous conditions for best results.

The vinyl hydroxyalkyl ether and acidic catalyst are mixed in the presence of solvent at a polymerizing temperature and the mixture is held at such temperature level until a desired degree of polymerization is attained. If desired, vinyl hydroxyalkyl ether or catalyst or additional solvent may be added as polymerization proceeds.

After a polyacetal has been formed, the catalyst is destroyed by addition of an alkaline reagent, and the reaction mixture is worked up. Insoluble salts may be filtered from the solution. Solvent may be evaporated and the polyacetal isolated.

As vinyl hydroxyalkyl ethers there are used ethers of the formula $CH_2=CHOC_nH_{2n}OH$ wherein $C_nH_{2n}$ as an alkylene group having a chain of two to three carbon atoms between oxygen atoms. The hydroxyalkyl groups are thus basically hydroxyethyl or hydroxypropy groups, but they may contain alkyl substituents which raise the total number of carbon atoms as high as twelve or even more.

These ethers are available from the reaction of acetylene and a 1,2- or 1,3-glycol by known methods. Typical simple glycols are ethylene, propylene, trimethylene, 1,2-butylene, 2,3-butylene, 1,3-butylene, 1,2-pentylene, or 2,2-dimethyl-1,3-trimethylene glycols. Other glycols include 2-methyl-1,2-pentanediol, 2-ethyl-1,3-pentanediol, 2-methyl-1,2-butanediol, 2-methyl-2,3-butanediol, 2-methyl-3,4-butanediol, 2,4-dimethyl-1,3-pentanediol, 2,2-diethyl-1,3-propanediol, 2-isopropyl-1,3-pentanediol, 2-methyl-1,3-octanediol, 2-ethyl-1,3-heptanediol, 2-ethyl-2-tert.-butyl-1,3-propanediol, 2-hexyl-2-methyl-1,3-propanediol, 1,2-hexanediol, 3,4-hexanediol, 2,3-dimethyl-2,3-butanediol, 2,5-dimethyl-5,8-octanediol, 4-methyl-4,5-undecanediol, and similar glycols. Those having an alkylene chain of not over twelve carbon atoms are of primary interest because of their physical form and the solubilities of ethers made therefrom. Mixtures of the vinyl ethers of different glycols may also be used. The simplest glycols, ethylene, propylene, and trimethylene, are of the most importance and yield final products with most unusual properties and utilities.

Additional details of the process are shown in the following illustrative examples.

*Example 1*

A reaction vessel was equipped with an agitator, a low temperature thermometer, a tube for admitting boron trifluoride gas, Bunsen valve, and soda-lime drying tube. The vessel was surrounded with a bath for cooling with acetone and Dry Ice.

A portion of vinyloxyethanol was dried over potassium hydroxide, treated with sodium, and distilled at 141° C. There was placed in the cooled reaction vessel 31.4 grams of the freshly distilled product and 55 cc. of liquid methyl chloride was added. The temperature of the mixture was −44° F. Thereto was added 0.314 gram of anhydrous boron trifluoride. The reaction mixture was then held at −40° F. for 15 minutes and during the next 10 minutes allowed to warm up to +5° F., at which point 5 grams of sodium carbonate was added. Methyl chloride boiled off as the temperature increased. The batch was thinned with 30 cc. of methylene chloride and filtered with the aid of a diatomaceous earth. The filtrate was stirred and heated under reduced pressure to 100° C./8 mm. A clear viscous product resulted in an amount of 22.1 grams. It had a refractive index of 1.4550 at 20° C. (monomeric vinyloxyethanol has a refractive index of 1.4345 at 20° C.). The viscosity of this polyacetal was 3,571 centistokes at 100° F.

Reaction of this product with 2,4-dinitrophenylhydrazine reagent containing sulfuric acid gave the hydrazone of acetaldehyde. A quantitative test yielded 52 mole per cent of the polyacetal as acetaldehyde. From the residue there was obtained ethylene glycol dibenzoate by reaction with benzoyl chloride.

The product was a linear polyacetal which was soluble in methanol, benzene, and cold water. An aqueous solution became cloudy upon standing and being warmed.

*Example 2*

The procedure of Example 1 was followed with 30 grams of vinyloxyethanol, 57 cc. of methyl chloride, and 0.3 gram of boron trifluoride at a reaction temperature of −48° to −50° F. Acidity was destroyed with soda ash and the product isolated as above.

It was a linear polyacetal. An ebullioscopic determination of molecular weight gave a value of 3090. The hydroxyl group was quantitatively determined by use of the Grignard reagent—the Tschugaeff and Zerewitinoff method, giving an apparent molecular weight of 2951. As above, the dinitrophenylhydrazone of acetaldehyde was formed and ethylene glycol dibenzoate by the Schotten-Bauman reaction.

The polyacetal as obtained above has substantially the structure $$CH_2=CH[OC_2H_4OCH(CH_3)]_xOC_2H_4OH$$

where $x$ is a number one less than the number of monomer units entering into the polymer. With an average molecular weight for the polyacetal of about 3000 there are about 34 monomer units in the polymer. Then $x$ has a value of 33.

The preparation of a polyacetal was started as above at −50° F. After 50 minutes at this temperature an equivalent weight of commercial dodecyl alcohol was added. The reaction mixture was stirred and kept between −40° and −64° F. for four hours. Then, during the course of 18 minutes the reaction mixture was allowed to warm up to −2° F. Sodium hydroxide flakes were added and the temperature of the batch raised to +15° F., whereupon a small amount of a 45% sodium hydroxide solution was added. The product was taken up in benzene. The benzene solution was dried over sodium sulfate and sodium carbonate and filtered. The filtrate was stripped up to 100° C./2 mm. to give a viscous amber resinous material. One gram of this product in 24 grams of water gave a foamy, soapy solution. This material effectively emulsified benzene in water. The emulsion was broken by the addition of a small amount of acid and could not be reformed after neutralization of the acid.

*Example 3*

A solution of 10.2 grams of vinyloxyethanol in 40 cc. of methyl chloride was cooled to −44° F. and 0.89 gram of stannic chloride added thereto. The mixture was warmed to −26° F., when a mildy exothermic reaction was noted. When a temperature of +2° F. was reached, an exothermic reaction again took place. The temperature of the mixture was raised to 140° F. after which it was dropped to −2° F. Sodium carbonate (2.5 grams) was added and the mixture was stirred for three hours. The batch was filtered and the filtrate stripped under reduced pressure. A 47% yield of a polyacetal was obtained. Its properties were entirely comparable to those described above.

*Example 4*

A mixture of 10 parts by weight of vinyloxy-2-ethyl-3-hexanol and 20 parts of methyl chloride was chilled to −50° F. Thereto was added 0.25 part of boron trifluoride-ethyl ether complex. The resulting mixture was stirred and held at −45° to −55° F. for an hour. The mixture was allowed to warm up and at about 0° F. two parts of sodium carbonate was added. The product was taken up in benzene and filtered. The filtrate was then stripped by heating to 110° C./5 mm. There resulted a very viscous product. It reacted with the 2,4-dinitrophenylhydrazine reagent to give a hydrazone, thus showing that the product was a polyacetal. It was soluble in hydrocarbon solvents but insoluble in water.

*Example 5*

A reaction vessel was charged with 30 parts by weight of vinyloxyethanol and 55 parts of methyl chloride and this mixture was cooled to −60° F. There was added 0.52 part of polyphosphoric acid. The reaction mixture was allowed to warm up slowly. Between −30° and −20° F. a mildly exothermic reaction began. The mixture was held at −20° F. for an hour. It became quite viscous and slightly hazy. It was then brought to −10° F., treated with 0.7 part of sodium hydroxide and 0.4 part of water, and allowed to warm up further. There was added 40 parts of benzene, the small aqueous layer resulting was taken off, and the organic layer was dried with sodium carbonate and sodium sulfate. The dried layer was filtered and evaporated to yield under reduced pressure a viscous liquid, which was a polyacetal in a yield of 75%. It had a viscosity of 474 centistokes at 100° F., was soluble in cold water and in benzene, but was insoluble in hot water.

Other anhydrous phosphoric acids act like the above polyphosphoric acid. The phosphoric acid catalysts are very satisfactory ones. They are best used at polymerizing temperature below about −20° C.

*Example 6*

A mixture of 0.3 part of anhydrous aluminum chloride and 55 parts of methyl chloride was cooled with stirring to −94° F. There was added 30.8 parts of vinyloxyethanol while the temperature of the reaction mixture was allowed to rise to −48° F. The mixture was then stirred and held at −50° F. for 1.5 hours. There was then added a portion of 6.3 parts of a 5% sodium hydroxide solution. The resulting mixture was stirred and allowed to warm up. Benzene was added and the mixture filtered. The filtrate was evaporated and stripped at 100° C./1 mm. to remove unpolymerized vinyloxyethanol. The product was a viscous, clear liquid polyacetal.

*Example 7*

A solution of 31.4 parts of vinyloxyethanol in 65 parts of methyl chloride was cooled with stirring to −75° F. There was added 0.2 part of sulfuric acid and the reaction mixture was held between −75° and −60° F. for two hours. A portion of sodium carbonate was stirred into the reaction mixture while it was at −70° F. It was worked up as in Example 6. The product was a viscous liquid which was proved to be a polyacetal by methods discussed above.

*Example 8*

A mixture of 31 parts of vinyloxyethanol and 50 parts of methyl chloride was cooled to −50° F. and 0.5 part of pure p-toluene sulfonic acid was added. The temperature of the reaction mixture was held at −50° to −40° F. for an hour, the mixture being constantly stirred. With the temperature at −50° F. there was stirred into the mixture 0.15 part of sodium carbonate in 4 parts of water. The mixture was worked up as above. There was obtained a yield of 38% of a polyacetal.

*Example 9*

A reaction vessel was charged with 25 parts by weight of vinyloxypropanol in 55 parts of methyl chloride. The mixture was cooled to −50° F. and treated with one half part of polyphosphoric acid. The mixture was stirred and the temperature allowed to rise slowly until it was observed that a reaction was taking place. The temperature was held between −20° F. and −30° F. for two hours. One part of lime was added and the reaction mixture was allowed to warm up. The solution was diluted with benzene and filtered with a little added filter aid. The filtrate was evaporated under reduced pressure to yield a viscous residue, which was soluble in water. The apparent molecular weight of this product was 2150, indicating the polymerization of about 21 units. The product may be assigned the formula

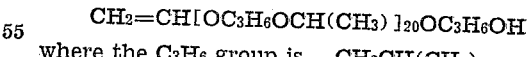

$$CH_2=CH[OC_3H_6OCH(CH_3)]_{20}OC_3H_6OH$$

where the $C_3H_6$ group is $-CH_2CH(CH_3)-$.

*Example 10*

The procedure of the previous example was followed with substitution of 25 parts of the compound $CH_2=CHOCH_2CH_2CH_2OH$. A viscous polyacetal was obtained as a residue. It had water solubility, giving very viscous solutions. This polyacetal had a structure

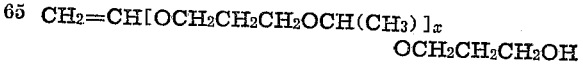

$$CH_2=CH[OCH_2CH_2CH_2OCH(CH_3)]_x$$
$$OCH_2CH_2CH_2OH$$

giving a phenylhydrazone with the 2,4-dinitrophenylhydrazine reagent, adding to dodecanol in the presence of trimethylbenzyl-ammonium hydroxide to yield a surface active product, and showing an active hydrogen, the Zerewitinoff method, indicating a molecular weight of 1220. This would correspond to a value of $x$ of eleven.

The treatment of vinyl hydroxyalkyl ethers of the type specified at a low temperature with a strongly acidic condensing agent leads to linear polyacetals. Two or more molecules of the vinyl ether combine through reaction of vinyl group, $CH_2=CH-$, and the hydroxyl group of the half etherfied glycol unit. Polyacetals with as many as 100 monomer units or more can be formed under the conditions specified above without difficulty. A range of 10 to 100 for $x$ is of particular interest.

This application is a continuation-in-part of our application Serial No. 192,608, filed October 27, 1950.

We claim:

1. A process for preparing linear polyacetals of the structure $$CH_2=CH[OC_nH_{2n}OCH(CH_3)]_xOC_nH_{2n}OH$$

which comprises treating an ether of the formula $CH_2=CHOC_nH_{2n}OH$ dissolved in an inert organic solvent with a strongly acidic condensing agent at a polymerizing temperature below $-5°$ C., whereby a polyacetal is formed, and then destroying said agent at a temperature below $-5°$ C., $C_nH_{2n}$ being an alkylene group of not over 12 carbon atoms having a chain of two to three carbon atoms between oxygen atoms and $x$ being an integer.

2. A process for preparing polyacetals of the structure $$CH_2=CH[OC_nH_{2n}OCH(CH_3)]_xOC_nH_{2n}OH$$

which comprises treating an ether of the formula $CH_2=CHOC_nH_{2n}OH$ dissolved in an inert organic solvent with a boron trifluoride catalyst at a polymerizing temperature between $-15°$ C. and $-60°$ C., $C_nH_{2n}$ being an alkylene group of not over 12 carbon atoms having a chain of two to three carbon atoms between oxygen atoms and $x$ being an integer.

3. A process for preparing linear polyacetals of the structure $$CH_2=CH[OC_nH_{2n}OCH(CH_3)]_xOC_nH_{2n}OH$$

which comprises treating an ether of the formula $CH_2=CHOC_nH_{2n}OH$ in an inert organic solvent with a Friedel-Crafts metal halide at a polymerizing temperature below $-5°$ C. and then destroying said halide by adding an alkaline reagent at a temperature below $-5°$ C., $C_nH_{2n}$ being an alkylene group having a chain of two to three carbon atoms between oxygen atoms and $x$ being an integer.

4. A process for preparing linear polyacetals of the structure $$CH_2=CH[OC_nH_{2n}OCH(CH_3)]_xOC_nH_{2n}OH$$

which comprises treating an ether of the formula $CH_2=CHOC_nH_{2n}OH$ in an inert organic solvent with a strong acid at a polymerizing temperature below $-5°$ C. and then neutralizing said acid at a temperature below $-5°$ C., $C_nH_{2n}$ being an alkylene group of not over 12 carbon atoms having a chain of two to three carbon atoms between oxygen atoms and $x$ being an integer.

5. A process for preparing linear polyacetals of the structure $$CH_2=CH[OC_nH_{2n}OC(CH_3)]_xOC_nH_{2n}OH$$

which comprises treating an ether of the formula $CH_2=CHOC_nH_{2n}OH$ in an inert organic solvent with a phosphoric acid at a polymerizing temperature below about $-20°$ C., neutralizing said acid at a temperature below $-5°$ C., and separating a said polyacetal, $C_nH_{2n}$ being an alkylene group of not over 12 carbon atoms having a chain of two to three carbon atoms between oxygen atoms and $x$ being an integer.

HARRY T. NEHER.
LA VERNE N. BAUER.

REFERENCES CITED

The following references are of record in the file of this patent:

UNITED STATES PATENTS

| Number | Name | Date |
|---|---|---|
| 1,959,927 | Reppe | May 22, 1934 |
| 2,071,252 | Carothers | Feb. 16, 1937 |
| 2,104,000 | Reppe et al. | Dec. 28, 1937 |

FOREIGN PATENTS

| Number | Country | Date |
|---|---|---|
| 398,173 | Great Britain | Sept. 1, 1933 |

OTHER REFERENCES

Hill et al., Journal Amer. Chem. Soc., vol. 50, 1928, pages 2718 to 2725.

Hill, Journal Amer. Chem. Soc., vol. 50, 1928, pages 2725 to 2731.